United States Patent [19]

Byrd

[11] Patent Number: 4,674,351
[45] Date of Patent: Jun. 23, 1987

[54] COMPLIANT GEAR

[75] Inventor: William A. Byrd, Rockford, Ill.

[73] Assignee: Sundstrand Corporation, Rockford, Ill.

[21] Appl. No.: 812,255

[22] Filed: Dec. 23, 1985

[51] Int. Cl.⁴ .................... F16D 3/76; F16H 55/14
[52] U.S. Cl. ........................ 74/443; 74/411; 74/446; 74/665 B; 464/90
[58] Field of Search ............ 74/411, 443, 446, 665 B, 74/665 A, DIG. 10; 464/89, 90, 180; 474/902

[56] References Cited

U.S. PATENT DOCUMENTS

| | | | |
|---|---|---|---|
| 1,424,203 | 8/1922 | Keller | 74/414 |
| 1,928,763 | 2/1931 | Rosenberg | 74/443 |
| 2,187,706 | 1/1940 | Julien | 464/90 |
| 2,307,129 | 1/1943 | Hines et al. | 74/443 X |
| 2,460,630 | 2/1949 | Fawick | 74/411 |
| 2,702,995 | 3/1955 | Biedess | 74/411 |
| 2,753,731 | 7/1956 | McWethy | 464/89 X |
| 2,939,331 | 6/1960 | Weeks | 74/443 |
| 3,020,036 | 2/1962 | Kleinschmidt | 464/90 X |
| 3,071,850 | 1/1963 | Haushalter | 464/90 X |
| 3,076,352 | 2/1963 | Larsh | 74/443 |
| 3,167,975 | 2/1965 | Durand | 74/665 B |
| 3,216,267 | 11/1965 | Dolza | 74/219 |
| 3,304,795 | 2/1967 | Rouverol | 74/411 |
| 3,667,317 | 6/1972 | Hillingrathner | 74/443 |
| 3,757,608 | 9/1973 | Willner | 74/411 |
| 3,943,788 | 3/1976 | Kummel et al. | 74/411 |
| 3,952,546 | 4/1976 | Nakano et al. | 464/90 |
| 4,178,811 | 12/1979 | Shepherd | 464/89 X |

Primary Examiner—Allan D. Herrmann
Attorney, Agent, or Firm—Wood, Dalton, Phillips, Mason & Rowe

[57] ABSTRACT

A compliant gear which includes an inner hub portion, an outer ring gear portion, and a compliant laminate between the hub portion and the ring gear portion. The laminate includes a rigid laminar shim of generally uniform thickness sandwiched between a pair of elastomer layers of generally uniform thickness. The laminar shim and the elastomer layers extend generally parallel to the axis of rotation of the gear.

19 Claims, 3 Drawing Figures

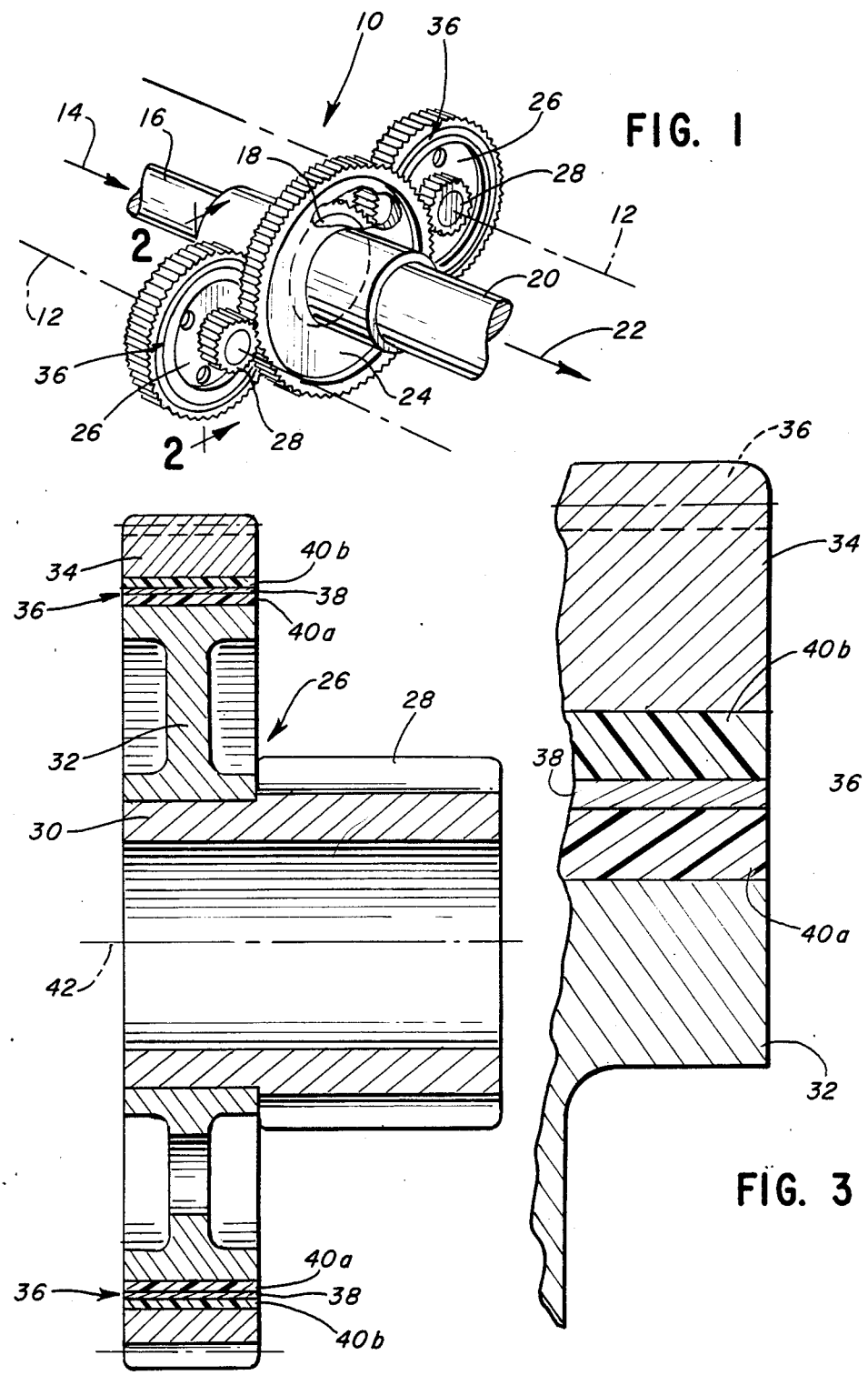

COMPLIANT GEAR

FIELD OF THE INVENTION

This invention generally relates to gearing and particularly to an improved compliant, shock absorbing and noise dissipating gear.

BACKGROUND OF THE INVENTION

Compliant gears have been used in various applications for shock absorbing purposes, for accommodating tolerance problems between meshing gear teeth and for reducing sound-generating vibrations caused by the meshing gear teeth.

In designing such a gear or gear systems, a yieldable material has been employed between a hub portion of the gear and a toothed ring portion of the gear. In essence, the yieldable material, such as rubber or other elastomer material, permits the gear teeth to move radially and torsionally relative to the rigid gear hub. Gear meshing problems are particularly prevalent in gear systems which employ parallel gear paths which require precise angular positioning of the gear teeth of a pair of gears on opposite sides of an output gear, for instance.

In designing compliant gears, it most often is desirable to have a fixed torsional stiffness for proper gear teeth meshing and power transmission. In other words, the gear teeth cannot twist beyond certain parameters based upon timing with other gears. On the other hand, the design must provide for radial stiffness to maintain center-line distances between the meshing gears as well as maintaining proper meshing geometry. The interrelationship between these parameters have constantly caused problems in gear design.

For instance, compliant gears conventionally have incorporated a single layer of elastomer material between a hub portion and a rim or ring gear portion of the gear. Elastomeric material, such as rubber, is an "incompressible fluid" and the torsional or radial stiffness thereof normally is a function of the thickness of the elastomer layer. Therefore, if a given torsional or sheer stiffness is desired, any change in the thickness of the elastomer layer for changing the radial stiffness would, of necessity, also change the torsional stiffness. Any change in the durometer of the elastomer layer also would change the torsional stiffness. Consequently, it is readily apparent that the simple use of an elastomer layer to provide a compliant gear has definite limitations This invention has solved many of these problems by providing a compliant laminate between the hub portion and the rim portion of the gear, the laminate including a rigid laminar shim sandwiched between a pair of elastomer layers. Such a novel construction provides considerably more radial stiffness but does not change the desired torsional stiffness in any given thickness of laminate between the hub and rim portions of the gear.

Much consideration also has been given in the past to reducing the sound-generating vibrations which accompany the meshing of gear teeth. Although the reduction of noise is desirable in any gear system which is intended to operate in the vicinity of human or animal hearing, the problem becomes particularly critical in designing apparatus, such as torpedos or other marine vessels, where noiseless and smooth operation is essential. Sound-generating vibrations are caused by the point where gears engage when the driving gear imposes a torque on the driven gear through contact between the mutually extending gear teeth. As successive gear teeth engage and disengage, it is apparent that a series of periodic compressive impulses are transmitted radially to the gear hub. These impulses are transmitted as vibrations from the hub to the gear shaft, from the shaft to the bearings, and to the supporting structure, where they emanate as sound from the larger gear casing surfaces. The sound is transmitted by waves through these components of the apparatus. Again, internal elastomer layers or structures have been employed for reducing the noise and undesirable vibrations caused by the meshing of the teeth in a pair of gears.

With the invention, by providing a laminate with an interior rigid laminar shim, the sound waves are broken to a considerably greater extent than prior compliant gears described above.

SUMMARY OF THE INVENTION

An object, therefore, of the invention is to provide a gear system with a new and improved compliant gear.

In the exemplary embodiment of the invention, a compliant gear includes a hub portion and a power transmitting rim portion. The rim portion comprises an outer toothed ring gear. A compliant laminate is disposed between the hub and rim portions. The laminate includes a rigid laminar shim sandwiched between a pair of elastomer layers. Of course, there may be multiple layers of elastomers and shims.

As shown herein, the laminar shim and the elastomer layers are of generally uniform thickness and extend generally parallel to the axis of rotation of the gear. However, the parallel elastomer layers and shims could be cone-shaped, or the like, and not be parallel to the gear axis itself. Generally, the elastomer layers are of greater thickness than the laminar shim. The elastomer layers are bonded to the laminar shim as well as to the respective hub portion or ring gear portion. The laminar shim may be fabricated of metal or like material, and the elastomer layers may be fabricated of rubber or like material.

The invention is illustrated herein in a gear system which includes parallel power paths, with one of the compliant gears coupled in each path and in mesh directly or indirectly with a common driven gear. Of course, it should be understood that the compliant gear of this invention has a wide range of applications, including planetary gear systems or the like. The internal compliant laminate not only provides shock absorbing and noise dissipating characteristics, but the compliant gear has very high radial stiffness without additional metallic supports and results in a gear component with desirable running center displacement.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 1 is a fragmented perspective view of a gear system employing a pair of compliant gears according to the invention;

FIG. 2 is a vertical section, on an enlarged scale, taken general line 2—2 of FIG. 1, through one of the gears of the invention; and FIG. 3 is an enlarged fragmented section through the area of the gear incorporating the compliant laminate.

DESCRIPTION OF THE PREFERRED EMBODIMENT

Referring to the drawings in greater detail, and first to FIG. 1, the invention is illustrated in a gear system, generally designated 10, which may be part of a parallel shaft gear box, including two parallel power paths 12. Such a gearing system is designed to divide power and reduce loads on the bearings of the system. With such arrangements, it is difficult to maintain tolerances and/or precise gear meshing in order to prevent an undue share of the load from being transmitted by one path.

More particularly, an input, indicated by arrow 14, is directed to a shaft 16 which carries a drive gear 18. A shaft 20 provides an output, as indicated by arrow 22. A driven gear 24 is coupled to output shaft 20. A pair of power transmitting gears 26, on parallel power paths 12, are in mesh with drive gear 18. Each power transmitting gear 26 includes an integral, smaller pinion gear 28 conjointly rotatable therewith and in mesh with driven gear 24. Therefore, it can be seen that the power is divided down paths 12 through gears 26, 28 which establish a driving relationship between drive gear 18 and driven gear 24.

The invention is illustrated as incorporated in power transmitting gears 26 as described above in relation to FIG. 1. However, it should be understood that the compliant gear concept of this invention is equally applicable for a wide range of gear systems, including planetary gear systems or other suitable applications.

More particularly, referring to FIGS. 2 and 3, each compliant gear 26 includes a hub portion 30, a web portion 32, and a rim portion 34. Rim portion 34 forms a ring gear including gear teeth 36 for the compliant gear.

It should be understood that compliant gear 26 is shown herein as being formed integrally with pinion gear 28. In other words, hub portion 30 actually comprises the hub for the compliant gear as well as the hub for the respective pinion gear. The term "hub portion" should be understood within the inventive concept and claims hereof as to include any type of gear which might have the hub portion, along with web portion 32, as a singular structural component or any other supporting structure.

The invention contemplates a compliant laminate, generally designated 36, between hub or web portion 32 and rim or ring gear portion 34. The laminate includes a rigid laminar shim 38 sandwiched between a pair of elastomer layers 40a and 40b. Of course, multiple elastomer layers and sandwiched shims are contemplated. The laminar shim and the elastomer layers each is of generally uniform thickness and extends generally parallel to the axis of rotation 42 of the gear. However, the elastomer layers and shims may be generally parallel to each other but not to the axis of the gear. For instance, cone-shaped (frusto-conical) elastomers and shims are contemplated. As illustrated, elastomer layers 40a, 40b generally are of greater thickness than laminar shim 38.

An exemplary dimensional arrangement of compliant gear 26 would be to provide the gear with an outside diameter of approximately four inches, with elastomer layers 40a, 40b having a thickness on the order of 0.05 inch and laminar shim 38 having a thickness on the order of 0.02 inch.

The laminar shim may be fabricated of metal or like rigid material, and elastomer layers 40a, 40b may be fabricated of rubber or like material. Elastomer layer 40a is bonded to hub or web portion 32 as well as to the inside annular surface of laminar shim 38. Elastomer layer 40b is bonded to rim or ring gear portion 34 as well as to the outside annular surface of laminar shim 38.

The inter-laminar shim 38 provides very high radial stiffness, in the range of a journal bearing, which heretofore has not been available with simple elastomer inserts in compliant gears. The stiffness allows for the use of an independent elastomeric construction without additional metallic supports and results in a gear element with desirable running center displacement.

The uniqueness of compliant laminate 36 can best be understood by envisioning a design wherein a given sheer or torsional stiffness is desired. This stiffness is a function of the thickness of any elastomer material disposed between hub portion 32 and rim portion 34 of the gear. The durometer of the elastomer material could be changed to increase the radial stiffness, but this, in turn, would change the sheer or torsional stiffness By using laminar shim 38, a considerably greater radial stiffness is provided without changing the sheer or torsional stiffness of the gear element.

Furthermore, in those applications where noise dissipation is a premium, the layered structure of compliant laminate 36 provides greater frequency dispersal of sound wave lengths as the waves must travel through the different layers of different material.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. In a gear system, a gear comprising:
   a gear hub portion;
   a gear power transmitting rim portion; and
   a compliant laminate between the gear hub and gear rim portions, the laminate including radial stiffness means for the gear in the form of a rigid laminar shim sandwiched between a pair of elastomer layers.

2. The gear system of claim 1 wherein said elastomer layers generally are of greater thickness than the laminar shim.

3. The gear system of claim 1 wherein said hub portion includes a gear web.

4. The gear system of claim 1 wherein said rim portion comprises a ring gear.

5. The gear system of claim 1 wherein said laminar shim is of generally uniform thickness and extends generally parallel to the axis of rotation of the gear.

6. The gear system of claim 5 wherein each of said elastomer layers is of generally uniform thickness and extends generally parallel to the axis of rotation of the gear.

7. The gear system of claim 6 wherein at least one of said elastomer layers is of greater thickness than the laminar shim.

8. The gear system of claim 1 wherein said elastomer layers are fabricated of rubber or like material.

9. The gear system of claim 1 wherein said laminar shim is fabricated of metal or like material.

10. The gear system of claim 1 wherein said elastomer layers are bonded to the laminar shim and to the respective hub portion or rim portion.

11. The gear system of claim 1 wherein the system includes parallel power paths, with one of said gears in each path and in mesh with a common driven gear.

12. A compliant gear, comprising:
an inner gear hub portion;
an outer ring gear portion; and
a compliant laminate between the gear hub portion and the ring gear portion, the laminate including radial stiffness means for the gear in the form of a rigid laminar shim of generally uniform thickness sandwiched between a pair of elastomer layers of generally uniform thickness, the elastomer layers being bonded to the laminar shim and to the respective hub portion or ring gear portion.

13. The compliant gear of claim 12 wherein said elastomer layers generally are of greater thickness than the laminar shim.

14. The compliant gear of claim 12 wherein said hub portion includes a gear web.

15. The compliant gear of claim 12 wherein said laminar shim extends generally parallel to the axis of rotation of the gear.

16. The compliant gear of claim 15 wherein said elastomer layers extend generally parallel to the axis of rotation of the gear.

17. The compliant gear of claim 16 wherein at least one of said elastomer layers is of greater thickness than the laminar shim.

18. The compliant gear of claim 12 wherein said elastomer layers are fabricated of rubber or like material.

19. The compliant gear of claim 12 wherein said laminar shim is fabricated of metal or like material.

* * * * *